US011835347B2

(12) United States Patent
Tsutsumida et al.

(10) Patent No.: US 11,835,347 B2
(45) Date of Patent: Dec. 5, 2023

(54) ROUTE SEARCH DEVICE, ROUTE SEARCH METHOD, AND ROUTE SEARCH PROGRAM

(71) Applicant: NIPPON TELEGRAPH AND TELEPHONE CORPORATION, Tokyo (JP)

(72) Inventors: Kyota Tsutsumida, Tokyo (JP); Mitsuru Mochizuki, Tokyo (JP); Osamu Matsuda, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 103 days.

(21) Appl. No.: 17/611,117

(22) PCT Filed: May 14, 2019

(86) PCT No.: PCT/JP2019/019189
§ 371 (c)(1),
(2) Date: Nov. 12, 2021

(87) PCT Pub. No.: WO2020/230277
PCT Pub. Date: Nov. 19, 2020

(65) Prior Publication Data
US 2022/0221283 A1    Jul. 14, 2022

(51) Int. Cl.
*G01C 21/34* (2006.01)
(52) U.S. Cl.
CPC .................. *G01C 21/343* (2013.01)
(58) Field of Classification Search
CPC .... G01C 21/34; G01C 21/3492; G01C 21/26; G01C 21/3415; G01C 21/32;
(Continued)

(56) References Cited

U.S. PATENT DOCUMENTS

2005/0137791 A1* 6/2005 Agrawala ............... G06T 11/60
701/454
2019/0178660 A1* 6/2019 Greenberg ......... G01C 21/3461

FOREIGN PATENT DOCUMENTS

JP    2012189461 A        10/2012
JP      201396713 A         5/2013
JP     2013096713 A   *     5/2013

OTHER PUBLICATIONS

E. W. Dijkstra (1959) "A Note on Two Problems in Connexion with Graphs" Numerische Mathematik, vol. 1, pp. 269-271.
(Continued)

*Primary Examiner* — Khoi H Tran
*Assistant Examiner* — Nhi Q Bui

(57) ABSTRACT

Routes can be found while improving the convenience of guidance for users. A route-searching device includes a search-condition acquisition unit that acquires search conditions for searching a route including a starting point and a destination; a route-data storage unit that stores a link ID, the node IDs of the starting point and the end point of a link, and road network information concerning a road network and including a link length; an instruction-data storage unit that stores instruction data including a type associated with the node ID, a value for the type, and a coefficient for the value; and a route generation unit that generates route candidates including the shortest route based on the search conditions and the road network information, calculating, for each of the route candidates, an index value based on information included in the instruction data, and outputting, as a search route, the route candidate with the index value improved from the index value of the shortest route.

18 Claims, 7 Drawing Sheets

(58) Field of Classification Search
CPC ............ G01C 21/3446; G01C 21/3453; G01C 21/343; G01C 21/3626; G01C 21/3815; G01C 21/3605; G01C 21/3655; G01C 21/3476; G01C 21/3644; G01D 2201/0213; G05D 1/0088; G05D 1/0212; G05D 1/0274

See application file for complete search history.

(56) References Cited

OTHER PUBLICATIONS

Kacorri et al. (2018) "Environmental Factors in Indoor Navigation Based on Real-World Trajectories of Blind Users" Proceedings of the 2018 CHI Conference on Human Factors in Computing Systems ACM, Apr. 21, 2018.

Furukawa et al. (2013) "A Pedestrian Navigation Method for User's Safe and Easy Wayfinding" Human-Computer Interaction Users and Contexts of Use. HCI2013. Lecture Notes in Computer Science, vol. 8006.

Jin Y. Yen (1971) "Finding the k shortest loopless paths in a network" Management Science, vol. 17, No. 11, pp. 712-716.

\* cited by examiner

Fig. 3

| LINK ID | STARTING-POINT NODE ID | END-POINT NODE ID | LINK LENGTH d |
|---|---|---|---|
| 1 | 1000 | 1001 | 10 |
| 2 | 1001 | 1002 | 20 |
| 3 | 1001 | 1003 | 13 |
| ... | ... | ... | ... |

Fig. 4

| NODE ID | TYPE | VALUE | COEFFICIENT a |
|---|---|---|---|
| 1000 | POI | CONVENIENCE STORE | 0.1 |
| 1000 | SHAPE OF INTERSECTION | T-JUNCTION | 0.3 |
| 1001 | POI | POST OFFICE | 0.3 |
| 1001 | POI | FIVE-WAY INTERSECTION | 0.1 |
| ... | ... | ... | ... |

ROUTE SEARCH DEVICE, ROUTE SEARCH METHOD, AND ROUTE SEARCH PROGRAM

CROSS-REFERENCE TO RELATED APPLICATIONS

This application is a U.S. National Stage Application filed under 35 U.S.C. § 371 claiming priority to International Patent Application No. PCT/JP2019/019189, filed on 14 May 2019, the disclosure of which is hereby incorporated herein by reference in its entirety.

TECHNICAL FIELD

The disclosed technique relates to a route-searching device, a route-searching method, and a route-searching program.

BACKGROUND ART

As conventional art, a technique is provided to search a route for a user to a destination and guide the user according to the search route in a map application or pedestrian navigation on a smartphone or the like and car navigation. As an example of a route-searching technique, a technique of searching a route from a starting point to a destination based on a shortest-route search algorithm, for example, Dijkstra's algorithm is available as described in NPL 1. Moreover, a method called turn-by-turn navigation for providing guidance, for example, "Turn right in 30 m" for right and left turns is available (for example, NPL 2).

In the generation of an instruction in turn-by-turn navigation, the instruction may include information on symbols and the shapes of intersections such as an end of a street. Symbols are, for example, information called POI (Point of Interest) including a convenience store and a post office at an intersection where a right or left turn is to be made. Since such information is included, an instruction like "Turn left at the corner of the post office" or an instruction like "Turn right at the end of the street" are generated to encourage a user to recognize an intersection where a turn is to be made. This technique is widely used (for example, NPL 3).

CITATION LIST

Non Patent Literature

[NPL 1] E. W. Dijkstra "A Note on Two Problems in Connexion with Graphs", Numerische Mathematik, vol. 1, 1959, pp. 269-271, doi:10.1007/BF01386390.
[NPL 2] Kacorri, Hernisa, et al. "Environmental Factors in Indoor Navigation Based on Real-World Trajectories of Blind Users". Proceedings of the 2018 CHI Conference on Human Factors in Computing System s. ACM, 2018.
[NPL 3] Furukawa H., Nakamura Y. (2013) A Pedestrian Navigation Method for User's Safe and Easy Wayfinding. In: Kurosu M. (eds) Huma n-Computer Interaction. Users and Contexts of Use. HCI 2013. Lecture Notes in Computer Science, vol 8006. Springer, Berlin, Heidelberg.
[NPL 4] Yen, Jin Y. "Finding the k shortest loopless paths in a network". management Science 17.11 (1971): 712-716.

SUMMARY OF THE INVENTION

Technical Problem

However, when instructions are generated as described in NPL 2 and NPL 3 by using the shortest-route search algorithm described in NPL 1, POI serving as symbols may be excluded from a shortest route. Thus, unfortunately, POI may be excluded from an instruction of route guidance.

The disclosed technique has been devised in view of the problem. An object of the disclosed technique is to provide a route-searching device, a route-searching method, and a route-searching program that enable route searching while improving the convenience of guidance for users.

Means for Solving the Problem

A first aspect of the present disclosure is a route-searching device including: a search-condition acquisition unit that acquires search conditions for searching a route including a starting point and a destination; a route-data storage unit that stores a link ID, the node IDs of the starting point and the end point of a link, and road network information concerning a road network and including a link length; an instruction-data storage unit that stores instruction data including a type associated with the node ID, a value for the type, and a coefficient for the value; and a route generation unit that generates route candidates including the shortest route based on the search conditions and the road network information, calculates, for each of the route candidates, an index value based on information included in the instruction data, and outputs, as a search route, the route candidate with the index value improved from the index value of the shortest route.

A second aspect of the present disclosure is a route-searching method in which a computer performs the steps of: acquiring search conditions for searching a route including a starting point and a destination; generating route candidates including a shortest route based on the search conditions, a stored link ID, the node IDs of a starting point and an end point of a link, and road network information concerning a road network and including a link length; calculating, for each of the route candidates, an index value based on information included in instruction data including a type associated with the node ID, a value for the type, and a coefficient for the value; and outputting, as a search route, the route candidate with the index value improved from the index value of the shortest route.

A third aspect of the present disclosure is a route-searching program causing a computer to acquire search conditions for searching a route including a starting point and a destination, generate route candidates including a shortest route based on the search conditions, a stored link ID, the node IDs of a starting point and an end point of a link, and road network information concerning a road network and including a link length, calculate, for each of the route candidates, an index value based on information included in instruction data including a type associated with the node ID, a value for the type, and a coefficient for the value, and output, as a search route, the route candidate with the index value improved from the index value of the shortest route.

Effects of the Invention

According to the disclosed technique, routes can be found while improving the convenience of guidance for users.

BRIEF DESCRIPTION OF DRAWINGS

FIG. 3 is an image of a database table of a route-data storage unit according to the present embodiment.

FIG. 4 is an image of a database table of an instruction-data storage unit according to the present embodiment.

DESCRIPTION OF EMBODIMENTS

Figure 1:
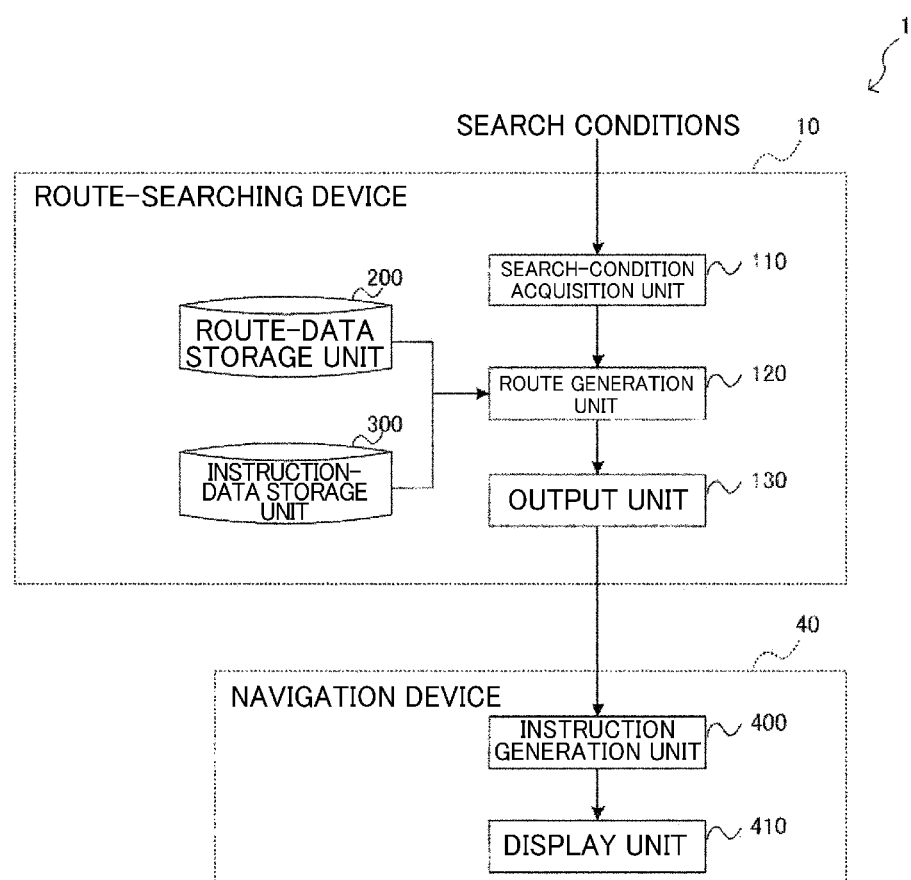
FIG. 1 is a block diagram illustrating the configuration of a route-searching system according to the present embodiment.

An example of an embodiment of the disclosed technique will be described below with reference to the accompanying drawings. In the drawings, the same or equivalent constituent elements and parts are indicated by the same reference numerals. Dimensional ratios in the drawings are exaggerated for purposes of illustration and may be different from actual ratios.

The configuration of the present embodiment will be described below.

FIG. 1 is a block diagram illustrating the configuration of a route-searching system according to the present embodiment.

As illustrated in FIG. 1, a route-searching system 1 includes a route-searching device 10 and a navigation device 40. The route-searching device 10 includes a search-condition acquisition unit 110, a route generation unit 120, an output unit 130, a route-data storage unit 200, and an instruction-data storage unit 300. The navigation device 40 includes an instruction generation unit 400 and a display unit 410.

Figure 2:
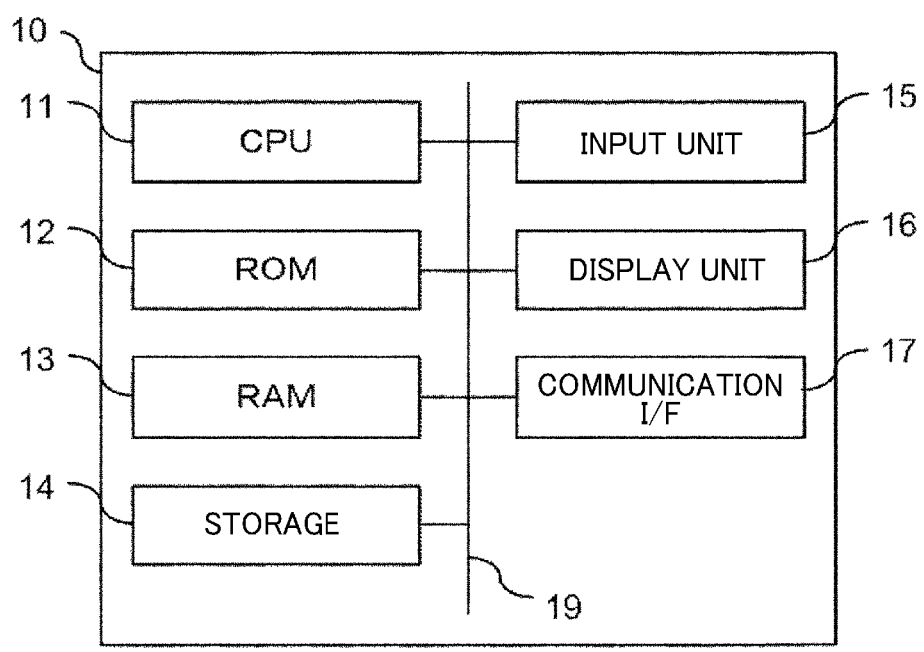
FIG. 2 is a block diagram illustrating the hardware configuration of a route-searching device.

FIG. 2 is a block diagram illustrating the hardware configuration of the route-searching device 10.

As illustrated in FIG. 2, the route-searching device 10 includes a CPU (Central Processing Unit) 11, a ROM (Read Only Memory) 12, a RAM (Random Access Memory 13, a storage 14, an input unit 15, a display unit 16, and a communication interface (I/F) 17. The configurations are connected via a bus 19 so as to communicate with one another.

The CPU 11 is a central processing unit that executes various programs and controls the units. Specifically, the CPU 11 reads a program from the ROM 12 or the storage 14 and executes the program with the RAM 13 serving as a work area. The CPU 11 controls the configurations and performs various computations according to programs stored in the ROM 12 or the storage 14. In the present embodiment, a route-searching program is stored in the ROM 12 or the storage 14.

The ROM 12 stores a variety of programs and data. The RAM 13 as a work area temporarily stores programs or data. The storage 14 includes an HDD (Hard Disk Drive) or an SSD (Solid State Drive) and stores various programs including an operating system and a variety of data.

The input unit 15 includes pointing devices such as a mouse and a keyboard and is used for performing various inputs.

The display unit 16 is, for example, a liquid crystal display that displays a variety of information. The display unit 16 may be a touch panel acting as the input unit 15.

The communication interface 17 is an interface for communications with other devices, e.g., a terminal. For example, standards such as Ethernet (registered trademark), FDDI, and Wi-Fi (registered trademark) are used.

The navigation device 40 may have the same hardware configuration as the route-searching device 10 and thus the detailed explanation thereof is omitted.

The functional configurations of the route-searching device 10 will be described below. The route-searching program stored in the ROM 12 or the storage 14 is read by the CPU 11 and is developed and executed in the RAM 13, so that the functional configurations are implemented.

FIG. 3 is an image of a database table of the route-data storage unit 200 according to the present embodiment. In the table of the route-data storage unit 200, a junction of a road, e.g., an intersection serves as a node, and a road divided by a road network serves as a link. The database of the route-data storage unit 200 is a reference database of an initial node ID serving as the node of the starting point of the road, a terminal node ID serving as the node of the endpoint, and a link (road) length d. A link ID serving as a road ID is used as a key. Information on a road network, including the link length d, will be referred to as road network information. Hereinafter, a variety of information included in the road network information is assumed to be stored in the route-data storage unit 200.

FIG. 4 is an image of a database table of the instruction-data storage unit 300 according to the present embodiment. The database of the instruction-data storage unit 300 includes, as instruction data with a node ID serving as a key, types including POI and the shapes of intersections, values including convenience stores and T-junctions, and a coefficient a (hereinafter, a is omitted unless the indication is necessary) that contributes to the generation of instructions during a search for a route. The database of the instruction-data storage unit 300 is configured to refer to information included in the instruction data. The value is an object indicating the specific symbol or characteristic of the type. The coefficient is, for example, a coefficient indicating the degree of contribution of the value to guidance. The type, the value, and the coefficient may be freely designed according to the scene of usage of navigation and the purpose of an application. For example, in order to include a landmark, e.g., a tourist attraction as a POI, "type: POI, value: xxx temple, coefficient: 0.4" is added. Moreover, in order to examine whether an intersection is likely to be conjected or not in the route generation unit 120, "type: congestion degree, value: large, coefficient: 1.5" may be added. The value indicates the name and characteristic of a landmark for the sake of explanation. The value is actually an identifiable value. Hereinafter, it is assumed that the type, the value, and the coefficient are stored in the instruction-data storage unit 300.

The route-searching device 10 acquires, as an input, search conditions for searching a route including a starting point and a destination.

The route generation unit 120 generates route candidates including a shortest route based on the search conditions and the road network information. The route generation unit 120 calculates index values for the route candidates based on information included in the instruction data and outputs, as an output route, the route candidate with an index value improved from that of the shortest route. Specifically, the k-th shortest path algorithm described in NPL 4 is used to generate route candidates in the ascending order of route lengths. Moreover, for the route candidates having route lengths equal to or less than a route length determined with a predetermined magnification relative to the shortest route, a corrected index value is calculated based on the information included in the instruction data so as to reduce or increase a route length obtained as the sum of the lengths of links included in the route candidates.

The detail of the processing of the navigation device 40 will be described after the explanation of the operations of the route-searching device 10.

The operations of the route-searching device 10 will be described below.

Figure 5:
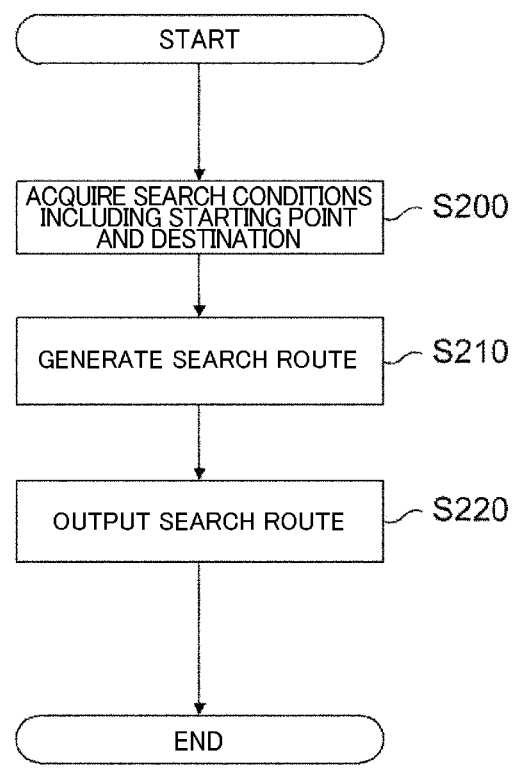
FIG. 5 is a flowchart indicating the flow of route searching by the route-searching device.

FIG. 5 is a flowchart indicating the flow of route searching by the route-searching device 10. The CPU 11 reads the route-searching program from the ROM 12 or the storage 14 and develops and executes the program in the RAM 13, so that a route is found. The route-searching device 10 receives the search conditions as an input and performs the following processing:

In step S200, as acquisition of the search conditions, the CPU 11 acquires the search conditions including a starting point and a destination in the search-condition acquisition unit 110 and outputs the search conditions to the route generation unit 120. The search conditions indicate a guidance route from a user or an external system.

In step S210, as route generation in the route generation unit 120, the CPU 11 then acquires the road network information from the route-data storage unit 200 and information included in the instruction data from the instruction-data storage unit 300. The CPU 11 generates a search route s*, which is a route found based on the acquired information, and outputs the route to the output unit 130.

In step S220, as the output processing of the search route in the output unit 130, the CPU 11 outputs the search route s* to the navigation device 40.

Figure 6:
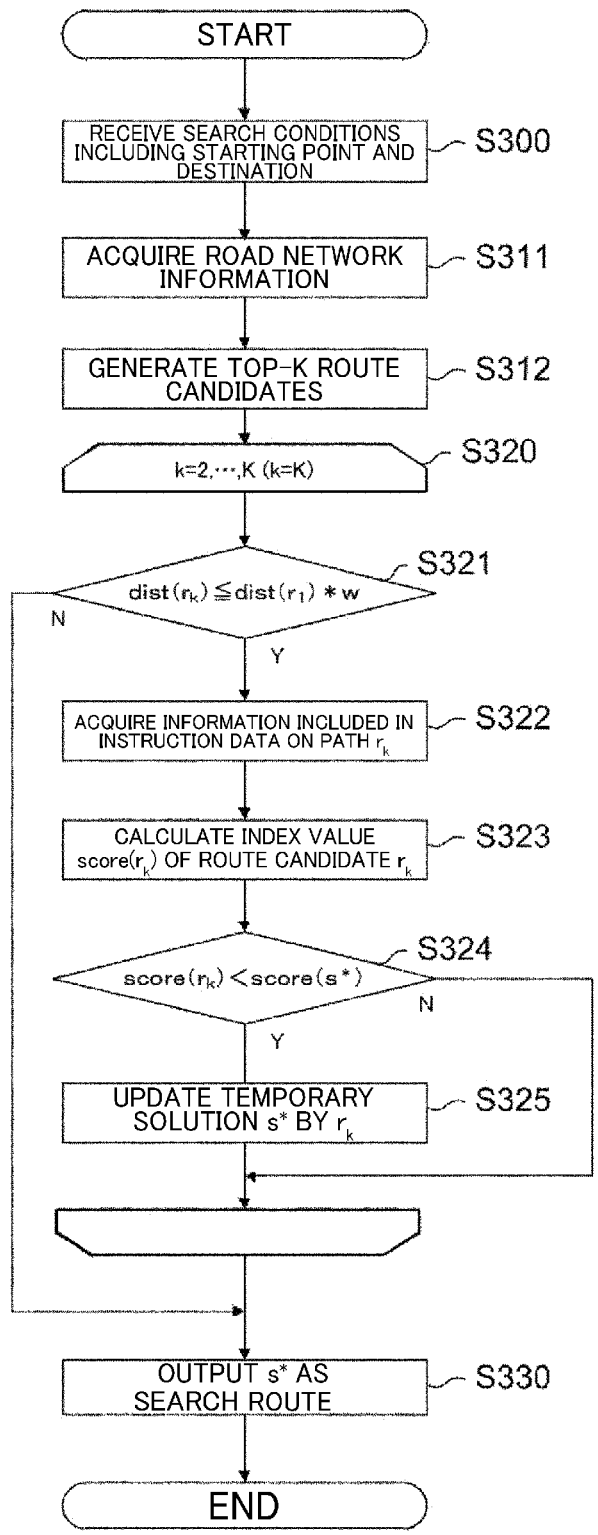
FIG. 6 is a flowchart indicating the detail of route generation.

FIG. 6 is a flowchart indicating the detail of route generation. According to the flowchart of FIG. 6, the route generation of the route generation unit 120 according to the present embodiment will be described below. The following processing is performed by the CPU 11 serving as the route generation unit 120.

In step S300, the CPU 11 receives the search conditions including a starting point and a destination from the search-condition acquisition unit 110.

In step S311, the CPU 11 acquires the road network information from the route-data storage unit 200 by using the search conditions that include the starting point and the destination and are acquired in step S300. The road network information to be acquired includes a link ID, an initial node ID and a terminal node ID that are associated with the link ID, and a link length.

In step S312, the CPU 11 then generates top-K route candidates in the ascending order of distances between a starting point and a destination by using the K-th shortest path algorithm, for example, the Yen's algorithm (NPL 4). A set of route candidates is denoted as R, and the k-th shortest route candidate is denoted as $r_k$. The shortest route is denoted as $r_1$. In the route candidate set R, the first route $r_1$ having the shortest distance serves as a temporary solution s* (s*=$r_1$) of a search route to be outputted. If K is set at a small value, e.g., 5 or 10, a computation time is determined as a practical value even by an underperforming computer. If K is set at a large value, e.g., 100 or 1000, satisfactory results can be found over a wider range.

In step S320, the CPU 11 sets the values of k (k=1, . . . , K). In this case, the CPU 11 may sequentially set the values of k from 2 except for 1, the shortest route candidate. Until the completion of a loop, that is, until k=K is satisfied, the CPU 11 repeats the following processing:

In step S321, for each route of the route candidate set R, the CPU 11 first determines whether a distance dist($r_k$) of the route $r_k$ is at most w times longer than the shortest route $r_1$ according to a comparison expressed by Formula (1):

$$dist(r_k) \leq dist(r1) * w \quad (1)$$

If the conditions of Formula (1) are satisfied, the CPU 11 advances to step S322. Otherwise the CPU 11 advances to step S330.

Thus, even if the index values of route candidates are preferable in the subsequent processing, the output of a search route with quite a long travel distance as compared with the shortest route $r_1$ can be avoided. Moreover, by using the route candidates $r_k$ sequentially sorted in order of distance in the route candidate set R, an unnecessary search is cancelled so as to enhance the speed of processing. The value of w can be determined according to an application. In the case of incorporation into a pedestrian navigation application, for example, 1.5 is set according to 1≤w≤2.

In step S322, the CPU 11 acquires information (a type, a value, and a coefficient) included in instruction data on the route $r_k$, from the instruction-data storage unit 300.

The information included in the instruction data is defined as follows: The set of node IDs for nodes included in the route candidates $r_k$ is denoted as $V_k$, the set of link IDs is denoted as $E_k$, each node ID is denoted as v∈$V_k$, and each link ID is denoted as e∈$E_k$. An initial node is denoted as i, the set of initial nodes for a link $e_j$ included in the set $E_k$ of link IDs is denoted as $I_k$, a coefficient for an initial node included in the link $e_j$ is denoted as $a_i$, and the length of the link $e_j$ for the set $E_k$ of link IDs is denoted as $d_i$. Thus, in step S322, the CPU 11 may acquire a type, a value, and the coefficient $a_i$ for the set $I_k$ of initial nodes.

In step S323, the CPU 11 calculates an index value score($r_k$) of the route candidates $r_k$ based on acquired information (a type, a value, and a coefficient) on POIs or the like. The sum of coefficients for all the types of v of node IDs is denoted as $a_v$. If the node ID of the instruction-data storage unit 300 in FIG. 4 is v=1000, POI: the coefficient a of a convenience store=0.1 and the shape of an intersection: the coefficient a of a T-junction=0.3 are determined. Thus, $a_v$ is obtained as $a_{1000}$=0.1+0.3=0.4. If the index value score($r_k$) is defined as a value determined by, for example, subtracting the sum $a_v$ of coefficients of types included in v of node IDs from the length d of each link, Formula (2) can be used as expressed below. In Formula (2), max( ) is a function for acquiring a maximum value, and θ is a threshold value for a subtraction of a link length. For example, 0.5 is used as a value of 0<θ<1.

$$score(r_k) = \sum_i d_i^* \max((1 - a_i), \theta) \quad (2)$$

In step S324, the CPU 11 compares the index value score($r_k$) calculated by Formula (2) and an index value score(s*) for the temporary solution s* according to Formula (3) below. In Formula (2), the index value for reducing a route length is used. In the case of an index value for increasing a route length, for example, $a_i$ may be added.

$$score(r_k) < score(s^*) \quad (3)$$

If the conditions of Formula (3) are satisfied, the CPU 11 advances to step S325. Otherwise the CPU 11 repeats the processing with subsequent set k in step S320 through the repeated loop until k=K is obtained.

In step S325, the CPU 11 determines that the index value has improved and updates the temporary solution s* by $r_k$. After the update, the CPU 11 repeats the processing with subsequent set k in step S320 through the repeated loop until k=K is obtained. As described above, the CPU 11 repeats the processing until the CPU 11 exits the loop in step S321 or obtains k=K.

In step S330, the CPU 11 outputs, to the output unit 130, s* as a search route that is obtained as a search result and completes the processing. The search route s* includes at least a link ID and a node ID that are necessary for generating a route.

The guidance of the navigation device 40 according to the present embodiment will be described below. The instruction generation unit 400 acquires the search route s* that is outputted from the output unit 130. Furthermore, the instruction generation unit 400 acquires information on the value of the corresponding node ID from the node ID included in the search route s* with reference to the instruction-data storage unit 300, and generates guidance information. A specific example will be described below. For example, it is assumed that the node ID included in the search route s* indicates a node around an intersection and a convenience store is located near the node. The instruction generation unit 400 acquires a type "POI" and a value "convenience store" with the node ID serving as a key and generates information on the acquired type and value as guidance information.

Figure 7:
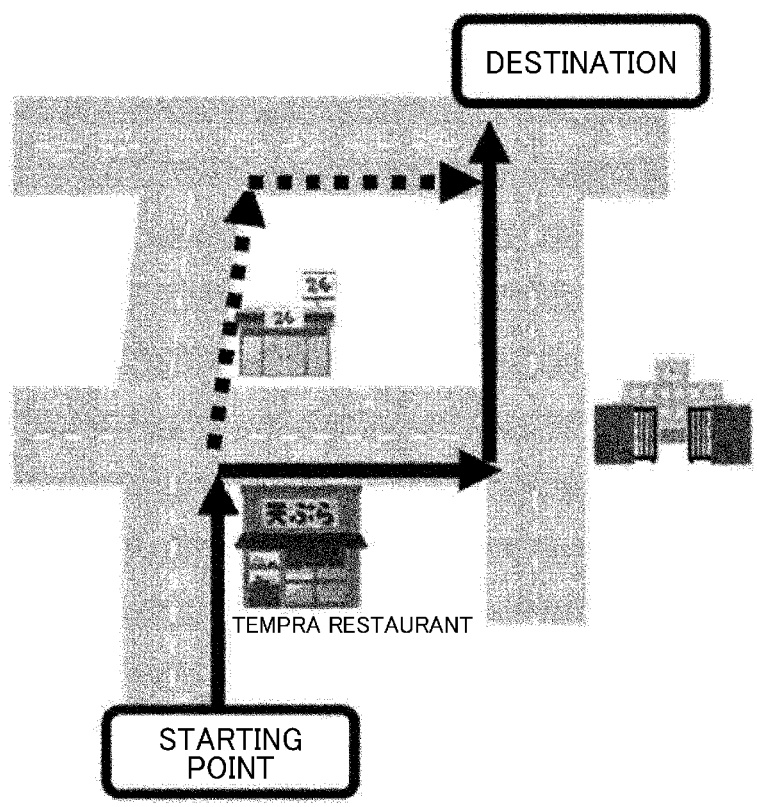
FIG. 7 illustrates an image of a comparison between a conventional technique and the technique of the present embodiment regarding the relationship between symbols on a search route.

FIG. 7 illustrates an image of a comparison between a conventional technique and the technique of the present embodiment regarding the relationship between symbols on a search route. In the example of FIG. 7, the use of an ordinary route-search algorithm according to the conventional technical displays a search route that is the shortest but turns at an intersection not including any POIs as indicated by a broken-line part in the example of the search route. The technique of the present embodiment can display a search route that includes a POI necessary for an instruction as indicated by a solid-line part.

As guidance information of the conventional technique, for example, an instruction "Turn right at the corner of the convenience store" is generated. In the route searching of the present embodiment, an instruction "turn right at the first intersection" is generated for an instruction in typical turn-by-turn navigation according to the conventional method. However, in the present embodiment, an instruction "Turn right between a tempura restaurant and a convenience store at the first intersection" can be generated. The instruction generation unit 400 displays the generated guidance information by means of the display unit 410. In the example of FIG. 7, instructions are displayed according to the technique of the present embodiment as follows: "1. Turn right between the tempura restaurant and the convenience store at the first corner. 2. Go ahead to the school at the end of the street and turn left. 3. Go straight ahead to the destination". To enable such guidance, for the node ID of a node for the link of a road where a right turn is made in the guidance of 1., "tempura restaurant" and "convenience store" are associated with the values of the instruction-data storage unit 300 and are set with effective coefficients. Thus, by referring to a value set at a coefficient value not smaller than a threshold value during the acquisition of the instruction generation unit 400 or adding information on values having effective coefficients to found information s* in advance, proper guidance information can be generated. As described above, the technique of the present embodiment enables guidance including landmarks serving as symbols for a user. Such guidance cannot be achieved only by outputting a shortest route.

As has been mentioned, the route-searching system of the present embodiment can search a route while providing convenient guidance for a user. Moreover, guidance information on search routes can be displayed while offering enhanced convenience to a user.

Routes found by reading software (program) according to the embodiment may be found by various processors other than a CPU. In this case, the processors may be, for example, a PLD (Programmable Logic Device) having a circuit configuration that is changeable after the manufacturing of an FPGA (Field-Programmable Gate Array) or the like and a dedicated electric circuit acting as a processor with a circuit configuration designed specifically for performing specific processing for an ASIC (Application Specific Integrated Circuit). Alternatively, a route may be found by one of the processors or a combination of at least two processors of the same type or different types (for example, multiple FPGAs and a combination of a CPU and an FPGA). More specifically, the hardware structure of the processors is an electric circuit in which circuit elements such as semiconductor devices are combined.

In the foregoing embodiment, the route-searching program is stored (installed) in advance in the storage 14. The present invention is not limited to this configuration. The program to be provided may be stored in non-transitory storage media such as a CD-ROM (Compact Disk Read Only Memory), a DVD-ROM (Digital Versatile Disk Read Only Memory), and USB (Universal Serial Bus) memory. Alternatively, the program may be downloaded from an external device via a network.

Regarding the foregoing embodiment, appendixes are disclosed as follows:

APPENDIX 1

A route-searching device comprising: a memory; and at least one processor connected to the memory, wherein the processor is configured to acquire search conditions for searching a route including a starting point and a destination, generate route candidates including the shortest route based on the search conditions, a stored link ID, the node IDs of the starting point and end point of a link, and road network information concerning a road network and including a link length, calculate, for each of the route candidates, an index value based on information included in instruction data including a type associated with the node ID, a value for the type, and a coefficient for the value, and output, as a search route, the route candidate with the index value improved from the index value of the shortest route.

APPENDIX 2

A non-transitory storage medium in which a route-searching program is stored, the route-searching program causing a computer to acquire search conditions for searching a route including a starting point and a destination, generate route candidates including the shortest route based on the search conditions, a stored link ID, the node IDs of the starting point and end point of a link, and road network information concerning a road network and including a link length, calculate, for each of the route candidates, an index value based on information included in instruction data including a type associated with the node ID, a value for the type, and a coefficient for the value, and output, as a search route, the route candidate with the index value improved from the index value of the shortest route.

REFERENCE SIGNS LIST

1 Route-searching system
10 Route-searching device
40 Navigation device
110 Search-condition acquisition unit
120 Route generation unit
130 Output unit
200 Route-data storage unit
300 Instruction-data storage unit
312 Step
324 Step
330 Step
400 Instruction generation unit
410 Display unit

The invention claimed is:

1. A route-searching device comprising:
a search-condition acquirer configured to acquire search conditions for searching a route including a starting point and a destination;
a route-data store configured to store a link ID, node IDs of a starting point and an end point of a link, and road network information concerning a road network and including a link length;
an instruction-data store configured to store instruction data including a type associated with the node ID, a value for the type, and a coefficient for the value; and
a route generator configured to:
generate route candidates including a shortest route based on the search conditions and the road network information,
determine, for each of the route candidates, an index value based on information included in the instruction data, wherein, for the route candidates having route lengths equal to or less than a route length determined with a predetermined magnification relative to the shortest route, the route generator updates the index value based on the information included in the instruction data so as to reduce or increase a route length obtained as a sum of lengths of links included in the route candidates having route lengths equal to or less than the route length determined with the predetermined magnification,
and
output, as a search route, the route candidate with the index value improved from the index value of the shortest route.

2. The route-searching device according to claim 1, wherein the route generator generates the route candidates in an ascending order of route lengths by using a predetermined algorithm.

3. The route-searching device according to claim 2, wherein the index value is generated by correcting the lengths of the links included in the route candidates having a route length equal to or less than the route length determined with the predetermined magnification, according to a coefficient corresponding to the type associated with the node ID included in the link.

4. The route-searching device according to claim 1, wherein if the value is included in the search route, information on the value corresponding to the search route is included.

5. A computer-implemented method for route searching, comprising:
acquiring, by a search-condition acquirer, search conditions for searching a route including a starting point and a destination;
generating, by a route generator, route candidates including a shortest route based on the search conditions, a stored link ID, node IDs of a starting point and an end point of a link, and road network information concerning a road network and including a link length;
determining, by the route generator, for each of the route candidates, an index value based on information included in instruction data including a type associated with the node ID, a value for the type, and a coefficient for the value, wherein for the route candidates having route lengths equal to or less than a route length determined with a predetermined magnification relative to the shortest route, the route generator updates the index value based on the information included in the instruction data so as to reduce or increase a route length obtained as a sum of lengths of links included in the route candidates having route lengths equal to or less than the route length determined with the predetermined magnification; and
providing, as a search route, the route candidate with the index value improved from the index value of the shortest route.

6. A computer-readable non-transitory recording medium storing computer-executable route-searching program instructions that when executed by a processor cause a computer system to:
acquire, by a search-condition acquirer, search conditions for searching a route including a starting point and a destination;
generate, by a route generator, route candidates including a shortest route based on the search conditions, a stored link ID, node IDs of a starting point and an end point of a link, and road network information concerning a road network and including a link length;
determine, by the route generator, for each of the route candidates, an index value based on information included in instruction data including a type associated with the node ID, a value for the type, and a coefficient for the value, wherein, for the route candidates having route lengths equal to or less than a route length determined with a predetermined magnification relative to the shortest route, the route generator updates the index value based on the information included in the instruction data so as to reduce or increase a route length obtained as a sum of lengths of links included in the route candidates having route lengths equal to or less than the route length determined with the predetermined magnification; and
provide, as a search route, the route candidate with the index value improved from the index value of the shortest route.

7. The route-searching device according to claim 2, wherein if the value is included in the search route, information on the value corresponding to the search route is included.

8. The route-searching device according to claim 3, wherein if the value is included in the search route, information on the value corresponding to the search route is included.

9. The computer-implemented method according to claim 5,
wherein the route generator generates the route candidates in an ascending order of route lengths by using a predetermined algorithm.

10. The computer-implemented method according to claim 5, wherein if the value is included in the search route, information on the value corresponding to the search route is included.

11. The computer-readable non-transitory recording medium according to claim 6,
wherein the route generator generates the route candidates in an ascending order of route lengths by using a predetermined algorithm.

12. The computer-readable non-transitory recording medium according to claim 6, wherein if the value is included in the search route, information on the value corresponding to the search route is included.

13. The computer-implemented method according to claim 9,
wherein the index value is generated by correcting the lengths of the links included in the route candidates having a route length equal to or less than the route length determined with the predetermined magnification, according to a coefficient corresponding to the type associated with the node ID included in the link.

14. The computer-implemented method according to claim 9, wherein if the value is included in the search route, information on the value corresponding to the search route is included.

15. The computer-readable non-transitory recording medium according to claim 11,
wherein the index value is generated by correcting the lengths of the links included in the route candidates having a route length equal to or less than the route length determined with the predetermined magnification, according to a coefficient corresponding to the type associated with the node ID included in the link.

16. The computer-readable non-transitory recording medium according to claim 11, wherein if the value is included in the search route, information on the value corresponding to the search route is included.

17. The computer-implemented method according to claim 13, wherein if the value is included in the search route, information on the value corresponding to the search route is included.

18. The computer-readable non-transitory recording medium according to claim 15, wherein if the value is included in the search route, information on the value corresponding to the search route is included.

* * * * *